United States Patent Office 3,723,245
Patented Mar. 27, 1973

3,723,245
APPARATUS FOR THE PRODUCTION OF ASBESTOS-CEMENT PIPES
Auguste Blary, Paris, France, assignor to Societe Anonyme Francaise Eternit, Paris, France
Filed Dec. 21, 1970, Ser. No. 100,256
Claims priority, application France, Dec. 30, 1969, 6945452
Int. Cl. B28b 21/48, 21/90; B31c 1/02
U.S. Cl. 162—284
6 Claims

ABSTRACT OF THE DISCLOSURE

A machine for manufacturing pipes from thin layers of paste material such as asbestos-cement wherein the layers are transferred to a rotary mandrel from at least one continuously-moving conveyor-belt by bringing the mandrel into contact with the belt along a horizontal generatrix laterally of the surface of the mandrel. The mandrel is supported by a moving carriage on a track which is parallel to the axis of the mandrel and is thus brought close to the conveyor-belts. At least one belt is applied against the mandrel by means of a pressure head which is fitted with elastic means so that the belt and mandrel can be relatively displaced as a result of increasing thickness of the layers which are deposited on the mandrel. Multiple carriages supporting separate mandrels may be mounted on the track for movement into contact with the conveyor belt and formation of separate pipe products, the track allowing the carriages to transport the mandrels and pipes to hardening and separation stations with ultimate return of the mandrel to the conveyor-belt for additional pipe formation.

---

This invention relates to a machine and to an installation which entails the use of said machine for the manufacture of pipes which are mainly of large diameter and especially pipes of asbestos-cement.

In known machines which have already been employed for the manufacture of pipes of this type, devices which are designed on a similar principle to those employed in the paper industry deposit on an endless belt a thin aqueous layer of asbestos and a suitable hydraulic binder which is then transferred onto a cylinder known as a mandrel around which said layer is rolled so as to form a pipe. Said transfer is obtained by placing the mandrel on the endless belt and by regulating the pressure exerted by this latter on said belt by means of a device which is placed underneath. Provision can also be made in these known devices for a variable-pressure drying means which produces action on the top generator-line of the pipe.

Machines of this type which give acceptable results for the manufacture of pipes having small diameters do not readily lend themselves to the manufacture of pipes having large diameters. The main reason for this is that it proves necessary to incorporate bulky and complex supports and handling means in the machine in order to operate the mandrels and this entails the need in particular for supporting frames which are also of very large size.

In accordance with the present invention, these disadvantages are circumvented by means of an installation which is primarily intended for the production of asbestos-cement pipes and in which the mandrels are supported by carriages, said carriages being capable of displacement along a suitable path which includes the different stages of manufacture. This result is achieved especially by means of a machine comprising conveyor-belts which are so designed that the mandrel is no longer placed above but between said belts and that the layer of material which is intended to form the pipe is conveyed at a higher speed.

In accordance with the invention, said machine is characterized in that the mandrel is supported by a moving carriage on a track parallel to the axis of the mandrel which is thus brought to the immediate vicinity of the conveyor-belts and that at least one of said belts is associated with a pressure head which applies said belt against the surface of the mandrel, said head being provided with elastic means for permitting the relative displacement of the belt and of the mandrel which results from an increase in thickness of the layers deposited on the mandrel by the belt.

The invention is also concerned with an installation for the practical application of the aforesaid machine, characterized in that said installation comprises a track for a plurality of moving carriages which each support a mandrel, said carriages being capable of moving along said track in order to come successively into contact with the conveyor-belt of the machine, the installation being capable of moving along said track in order to come successively into contact with the conveyor-belt of the machine, the installation being also provided with a station for hardening the layers which are transferred onto the mandrels and with a station for separating said layers from said mandrels which is located downstream of the hardening station.

The installation and the machine which are thus provided make it possible in particular to dispense with the greater part of the handling units which are required in known installations during the different stages of manufacture as well as to produce pipes which can be varied in diameter over a wide range simply by modifying the position of the endless belt with respect to the mandrel.

The invention will be explained in greater detail by means of the following description of one exemplified embodiment which is given without limitation, reference being made to the figures of the accompanying drawings, in which.

Figure 1:
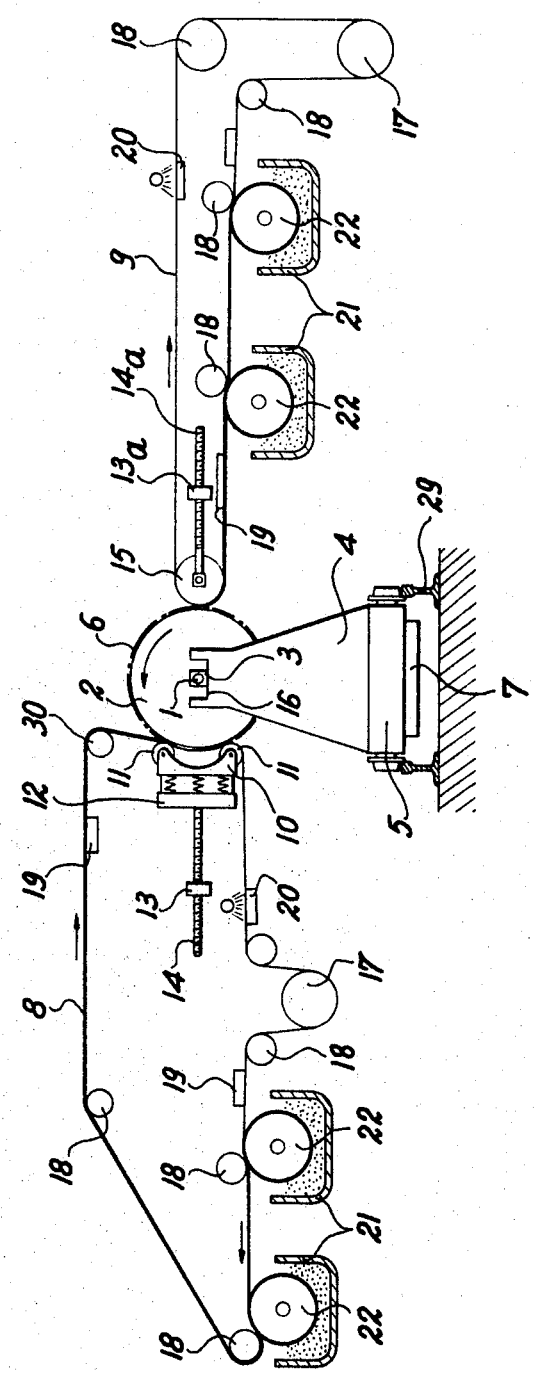
FIG. 1 is a view in elevation of a complete machine in accordance with a first form of construction.

In the form of construction which is illustrated in FIG. 1, the formation of a pipe 6 of asbestos-cement is carried out on a rotary mandrel 2 which is supported by a shaft 1 mounted in bearings 3 on two standards 4, said standards being rigidly fixed to a carriage 5 which runs on a track 29.

Endless belts 8 and 9 serve to convey a thin layer of paste, especially asbestos-cement, onto the mandrel 2 and are located symmetrically and horizontally with respect to the shaft 1 of the mandrel 2. The moving endless belts are applied in frictional contact with the mandrel 2 and thus drive this latter in rotation, thereby resulting in formation of the desired pipe.

The pressure which is necessary in order to ensure suitable contact between the endless belts 8 and 9 and the mandrel 2 is applied by a pressure head 10 located on the same side as the endless belt 8, said head being fitted with two drying rollers 11 and being capable of carrying out a relative movement with respect to the mandrel 2. To this end, the head 10 can be actuated by springs, pneumatic or hydraulic means or by any other mechanism which bears on a supporting table 12, said table being rigidly fixed to the frame of the machine by means of a stationary nut 13 and by means of a position-adjusting screw 14. The adjusting screw thus makes it possible to vary the working position of the belt 8 as a function of changes in diameter of the mandrel 2 which is used whilst the pressure head 10 is designed to accommodate the progressive backward motion entailed by the increase in thickness of the pipe 6 as this latter is being formed and permits the necessary displacements for withdrawal and/or positioning of the mandrel 2 or replacement of this latter by another mandrel having either an identical or different diameter for the manufacture of another pipe.

In the machine which is illustrated in FIG. 1, the endless belt 9 does not have a pressure head such as the head 10 or a supporting table 12 but is simply carried by a head roller 15 which is connected by means of its shaft to a position-adjusting screw 14a and to a stationary nut 13a which is in turn rigidly fixed to the frame of the machine. In this arrangement, the relative position of the endless belt 9 with respect to the mandrel 2 is not modified after preliminary adjustment as a function of the diameter of said mandrel; only the endless belt 8 serves to accommodate the positional variations entailed by variations in thickness of the asbestos-cement pipe 6 and by changes of mandrel.

In the machine under consideration, the opposite forces exerted by the belts 8 and 9 which produce action on the mandrel 2 are cancelled respectively whilst the transverse displacement of the mandrel 2 which is made necessary by the variation in thickness of the pipe 6 is permitted by the free displacement of the bearings 3 which carry the shaft 1 on slideways 16. Finally, the machine is provided in the case of each belt 8 and 9 with a tensioning device which is designed especially in the form of a cylinder 17 and placed at any one point of the path of travel of the belt under consideration so as to maintain suitable tension, especially during the movement resulting from the action of the position-adjusting screws 14 and 14a and of the pressure table 10 in the case of the belt 8.

In a machine of this type, the endless belts 8 and 9 are supported and guided by rollers 18, at least one of which is a driving roller for each endless belt. The belts themselves are preferably formed of felt and especially papermill felt. The deposition of a thin asbestos-cement layer on the belts 8 and 9 is obtained by means of cylindrical screening devices 22 associated with the elements which are usually employed in this type of machine, particularly elements such as 19 which produce suction so as to limit the quantity of liquid contained in the layer depostied on the belt, washing devices 20 and tanks 21, the respective number of which is determined as a function of the properties of the manufactured product. Without thereby departing from the scope of this invention, it would clearly also be possible to make use of other conventional devices for the purpose of depositing the desired layers of asbestos-cement on the endless belts 8 and 9.

Figure 4:
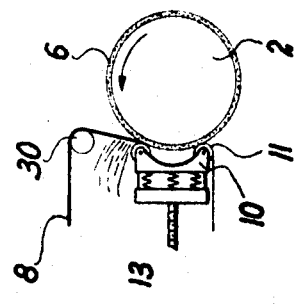
FIG. 4 is a detail view of the pre-drying device.

In the machine considered, the head 10 is fitted with drying rollers 11 which transmit the drying pressure received by the head to the thin asbestos-cement layer; a roller 30 which is located upstream of the head 10 in the direction of displacement of the belt 8 further assists the deposition of said layer on the mandrel 2 by subjecting the asbestos-cement to a pre-drying process which is obtained by adjusting the position of said roller. It is apparent from FIG. 4 that this positional adjustment is carried out so that said roller 30 should not exert pressure on the layer of paste at this point but should on the contrary define a space between the endless belt 8 and the mandrel 2 which is slightly wider than the thickness of the layer which is formed; said space constitutes an admission guide for the asbestos-cement paste and a filtering arc for the endless belt 8. In practice, this prevent deterioration of the layer as it arrives on the mandrel 2 while the pre-drying water is discharged through the endless belt 8 itself. Positional adjustment of the roller 30 with respect to the mandrel 2 can be carried out by any known means whether mechancal, pneumatic, hydraulic or the like. It should be noted that a device of this type is not necessary on the side corresponding to the endless belt 9 since the drying function of this latter takes place at the same time as the deposition of paste and the corresponding water is discharged freely to the ground.

The machine which is thus constructed makes it possible to manufacture pipes having any desired cross-sectional shape and a radius of curvature which can be varied over a very wide range; the machine can be adapted to all variations in said shapes solely on condition that the pressure table 10 is capable of accommodating the differences in position which consequently become necessary while maintaining a suitable contact between the endless belts 8 and 9 and the mandrel 2.

Figure 2:
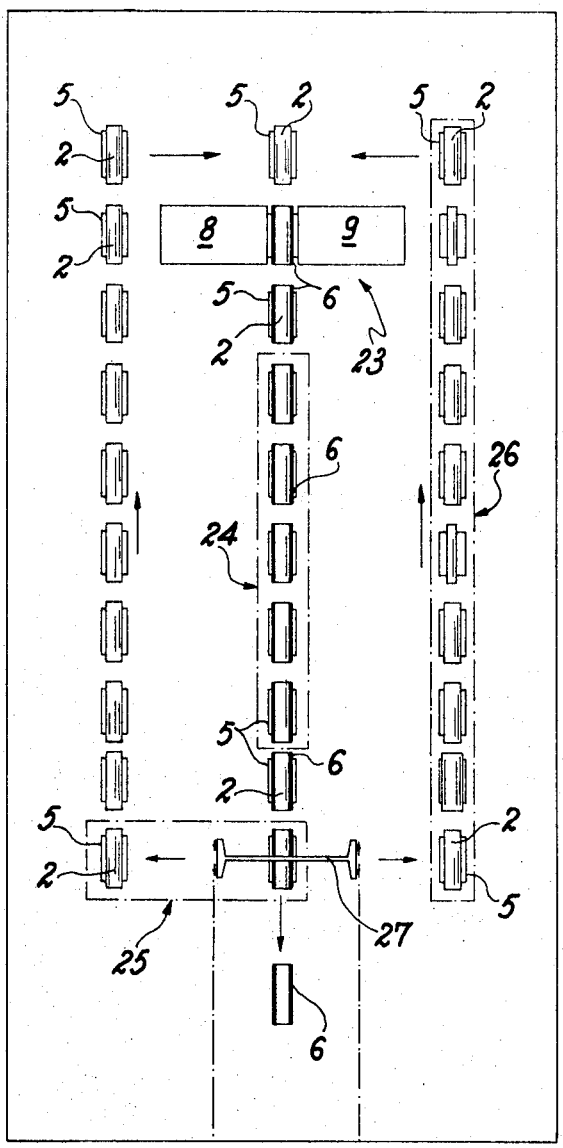
FIG. 2 is a diagrammatic plan view of said machine and of a complete manufacturing circuit.

The machine which has been described in the foregoing can advantageously be employed in the field of a general production-line layout as represented in plan in FIG. 2 in which the endless belts 8 and 9 are shown diagrammatically at 23, the mandrel 2 being shown in this case during use between said endless belts. This figure represents the path of travel or circuit which can be adopted for a series of carriages 5 each carrying a mandrel either in the uncoated condition or provided with a coating of absestos-cement which constitutes the pipe 6. A zone 24 which is provided downstream of the station 23 is assigned to hardening of the pipes 6 on the mandrels, whether the hardening process is accelerated or not; the zone 25 which immediately follows serves to carry out the de-mandrelling operation which consists in separating the hardened asbestos-cement pipe 6 from its mandrel 2. The direction of motion in the circuit of this installation is indicated by arrows in the figure. It is thus apparent that the mandrels 2 on their carriages 5 return to the input end of the machine while the asbestos-cement pipes are separated from the carriages as they pass out of the zone 25 by means of handling equipment units such as a traveling bridge crane 27. In an installation of this type, a zone 26 can also be provided in parallel with the main circuit for incorporating mandrels for pipes of different diameters at the input end of the machine without interrupting the production while making it possible in this case to remove existing uncoated mandrels and to replace these latter by different mandrels. Within the installation as a whole, the carriages 5 run along a track 29 (shown in FIG. 1) and are controlled either by hand or by any other suitable mechanical means.

Figure 3:
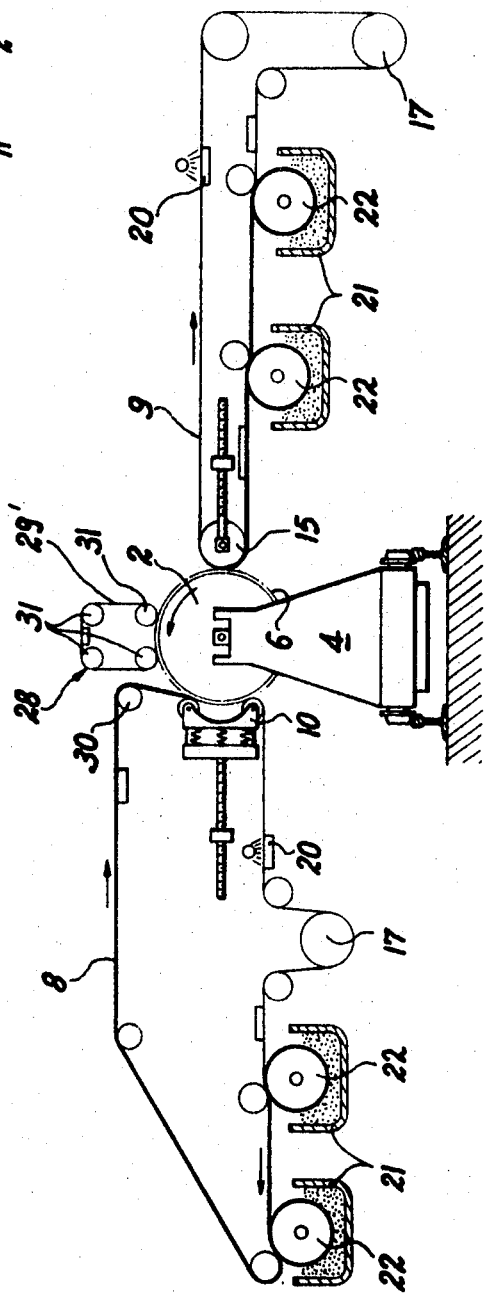
FIG. 3 is a partial view in elevation showing another form of construction.

FIG. 3 illustrates a first alternative form of construction of the machine having two endless belts 8 and 9 in which there has been added on the top generator-line of the mandrel 2 an additional drying device 28 of the felt band or rubber roller type, the design principle of which is conventional. A device of this type can be composed of an endless felt band 29' which applies pressure to the asbestos-cement pipe 6 during formation of this latter in order to produce additional drying action; said endless felt band 29' and its four supporting rollers 31 which may or may not be motor-driven form a unit 28 whose position can be adjusted by any known means with respect to the periphery of the asbestos-cement pipe 6 which is in process of formation.

Figure 5:
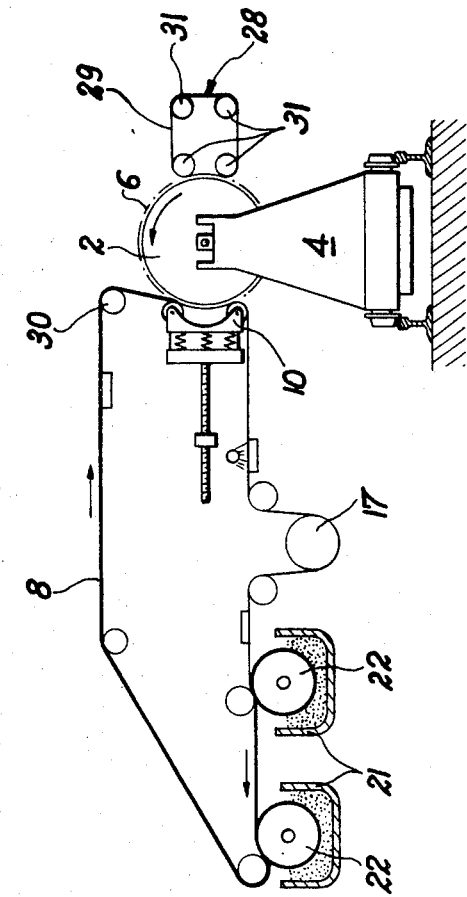
FIG. 5 is a partial view in elevation showing a third alternative form of construction.

In a second alternative embodiment which is illustrated in FIG. 5, said unit 28 can be employed in the place of the felt element 9 together with its support and ancillary components insofar as said unit exerts a sufficient drying pressure to balance the pressure which is produced by the head 10.

No matter what form of construtcion is adopted, the formation of a pipe 6 on the mandrel 2 is carried out as follows: the spacing of the endless belts 8 and/or 9 having previously been adjusted by means of the screws 14( 14a) and the pressure head 10 having been moved away from the pipe-formation zone, the carriage 5 which supports a mandrel 2 is then moved ito position. Said mandrel has been prepared for receiving an asbestos-cement pipe and the generator-lines of the mandrel which are located at the level of its axis are brought to the level of the screws 14. Action is then produced on the pressure head 10 in order to ensure that the endless belts 8 and 9 are brought into contact with the mandrel 2 and the formation of the asbestos-cement pipe 6 is then begun. When the desired thickness of pipe has been attained, the endless belt 8 is moved away from the mandrel by displacing the head 10 towards the right by means of the screw 14 and the nut 13; the carriage 5 which supports the mandrel 2 coated with asbestos-cement is then moved away from the machine along its track 29 whilst a fresh carriage 5 is moved into position between the endless belts 8 and 9 for the manufacture of another pipe.

In the fiugres, it has been considered sufficient to show only mandrels which have a circular transverse cross-section but it remains evident that the mobility of the pressure table 10 makes it possible to maintain the endless belt in close contact with a mandrel having a cross-sectional shape other than a circle and consequently to manufacture pipes having the shape of an ellipse or the like, whether regular or not.

Essential advantages are accordingly offered by the machine according to the invention, particularly insofar as its provides the possibility of reducing the handling means which were necessary in installations of the prior art, of increasing the rate of formation of asbestos-cement pipes, of producing pipes having a large diameter or a wide range of different cross-sectional shapes and finally of increasing the general efficiency of the installation with simplified handling operations.

Although the machine described in the foregoing is primarily concerned with the manufacture of pipes from an aqueous mixture of asbestos and binder, it is apparent that the machine could also be applied to the manufacture of any type of pipes which are formed from mixtures having different compositions and rolled in the state of paste around a mandrel, such mixtures being made up, for example, of any fibers together with the binders which are usually employed for impregnating said fibers.

What is claimed is:

1. A machine for the manufacture of pipes from thin layers of a pasty product of agglomerated mineral 1 fibers and a hydraulic binder, at least one endless belt transporting the product in continuous movement, guiding rollers for said belt mounted on parallel and horizontal axes, a rotating cyclindrical mandrel mounted on a horizontal axis, an external surface for said mandrel receiving the product from said belt, said transporting belt contacting said external surface of said mandrel along a horizontal lateral generatrix of said surface, a supporting movable carriage for said mandrel, a track parallel to the horizontal axis of said mandrel for said carriage, a pressure head, elastic means applying said head against said belt and said belt against said mandrel, a rigid table supporting said elastic means and said presure head and means for adjusting the position of said table with respect to said mandrel.

2. A machine according to claim 1 including a roller around which the conveyor-belt passes and the position of which respect to the generator-line of contact of the belt with the mandrel under the action of the pressure head is so determined that said belt forms with the surface of the mandrel a zone of progressively reduced width for guiding and aiding in filtering the layers to be transferred.

3. A machine according to claim 1 wherein said machine is provided in a position diametrically opposite to the conveyor-belt relative to the axis of the mandrel with a second continuously moving conveyor-belt placed in contact with the corresponding generator-line of the mandrel, said second belt being stationarily fixed and being unprovided with a pressure head.

4. A machine according to claim 3 wherein the generator-lines of contact of the two belts with the mandrel are located in the same horizontal plane which passes through the axis of said mandrel.

5. An installation for the manufacture of pipes comprising at least one machine in accordance with claim 1 wherein said installation comprises a plurality of moving carriages which each support a mandrel, said carriages being capable of moving along said track in order to come successively into contact with the conveyor-belt of the machine, the installation being also provided with a station for hardening the layers which are transferred onto the mandrels and with a station for separating said layers from said mandrels which is located downstream of the hardening station.

6. An installation according to claim 5 wherein the track comprises a circuit for the return of carriages downstream of the station for separating hardened layers from the mandrels for a further passage of said carriages within the machine.

References Cited
UNITED STATES PATENTS

| | | | |
|---|---|---|---|
| 3,619,361 | 11/1971 | Schoggl | 162—118 X |
| 3,144,378 | 8/1964 | Claessens | 162—122 |
| 3,388,039 | 6/1968 | Gillis et al. | 162—122 X |
| 3,032,289 | 5/1962 | Fredriksson et al. | 242—79 |
| 2,246,537 | 6/1941 | Rembert | 162—121 |
| 3,368,936 | 2/1968 | De Lerg | 162—284 X |
| 2,200,267 | 5/1940 | Ferla | 264—308 |
| 1,498,401 | 6/1924 | Perry | 162—120 |
| 2,430,411 | 11/1947 | Rembert | 162—121 |

S. LEON BASHORE Primary Examiner

R. H. TUSHIN, Assistant Examiner

U.S. Cl. X.R.

156—446, 448; 162—122; 242—55, 65, 79; 264—297, 308, 312; 425—115, 367, 447